No. 680,527. Patented Aug. 13, 1901.
H. HENTHORNE.
NUT LOCK.
(Application filed May 31 1901.)
(No Model.)
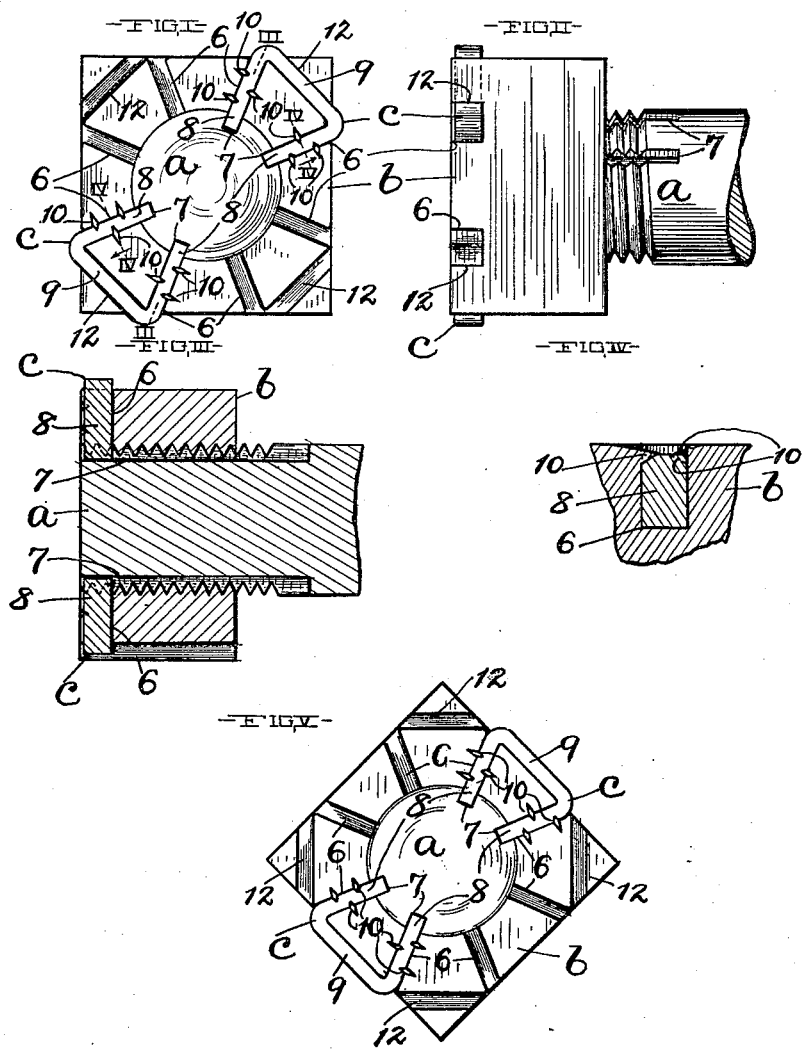

UNITED STATES PATENT OFFICE.

HENRY HENTHORNE, OF NEWARK, OHIO.

NUT-LOCK.

SPECIFICATION forming part of Letters Patent No. 680,527, dated August 13, 1901.

Application filed May 31, 1901. Serial No. 62,570. (No model.)

*To all whom it may concern:*

Be it known that I, HENRY HENTHORNE, a resident of Newark, in the county of Licking and State of Ohio, have invented certain new and useful Improvements in Nut-Locks; and I do hereby declare the following to be a full, clear, and exact description of the invention, such as will enable others skilled in the art to which it pertains to make and use the same.

My invention relates to improvements in nut-locks.

The object of this invention is to provide a nut-lock which will not only prevent the nut from becoming loose upon the engaging bolt, but will prevent the bolt from turning within the nut, which is simple, durable, and inexpensive in construction, and which can be readily applied and is reliable in its operation.

With this object in view and to the end of realizing other advantages hereinafter appearing my invention consists in certain features of construction and combinations of parts hereinafter described, and pointed out in the claims.

In the accompanying drawings, Figure I is an end elevation of a mutually-engaging bolt or stud and nut provided with my improved nut-lock. Fig. II is a right-hand side elevation relative to Fig. I. Fig. III is a section on line III III, Fig. I, looking in the direction indicated by the arrow. Fig. IV is a section in detail on either one of lines IV IV, Fig. I, looking in the direction indicated by the arrow, and this figure is drawn on an enlarged scale. Fig. V is an end elevation corresponding with Fig. I, except that in Fig. V the nut is shown turned to the right an eighth of a turn.

Referring to the drawings, $a$ designates the screw-threaded shank of a bolt or stud, and $b$ a correspondingly-threaded nut mounted upon the threaded portion of the bolt-shank or stud. The nut illustrated is square in end elevation and provided in its other end with eight grooves 6, arranged radially and spaced equidistantly circumferentially of the bolt or stud and open-ended—that is, each groove 6 opens at its inner end into the bore of the nut and has its outer extremity meeting the adjacent side of the nut—and the nut-engaging bolt or stud is provided within its threaded portion with one or more pairs of grooves or channels 7, extending longitudinally of the bolt and arranged a distance apart, circumferentially of the bolt, equal to the distance apart of two adjacent grooves 6 in the nut, so that any two adjacent grooves 6 in the nut can, upon turning the nut upon and circumferentially of the bolt or stud, be brought into registry with the different grooves or channels, respectively, of a pair of grooves or channels 7 of the bolt or stud.

One or more metallic fastening devices $c$, having members engaging two adjacent grooves 6 in the nut and having at least one of the said members extending into the bolt or nut, are provided and prevent not only the turning of the nut circumferentially of the bolt, but prevent also the turning of the bolt within the nut. Each fastening device $c$ comprises, preferably, a staple-like metallic strip or piece having two end members 8 and 8, engaging and extending longitudinally through two adjacent grooves 6 and 6 in the nut and projecting beyond the inner ends of the said grooves into the different grooves or channels, respectively, of a pair of grooves or channels 7, formed in the bolt-shank or stud, and the central portion 9 of the said fastening device snugly engages the nut between the said grooves 6 and 6 and connects together the said end members 8 and 8. Each fastening device $c$ has its two end members 8 and 8 converging inwardly and arranged radially of the nut to correspond with the radial arrangement of the engaging grooves 6 in the nut.

Preferably each end member 8 of each fastening device $c$ is overlapped at the outer side of the groove 6, engaged by the said member 8 by several small projections 10, formed on the nut by upsetting or displacing material from the nut over the exposed side of the said member 8, so as to positively secure the fastening device against displacement longitudinally of the bolt out of proper engagement with the engaging grooves in the nut, and I would here remark that the said projections 10, instrumental in the retention of a member 8 of a fastening device $c$ in the engaging grooves 6 of the nut, are preferably formed alternately at opposite sides of the said member 8. Preferably the grooves 6 in the nut are deep enough to render them capable of somewhat more than receiving the members 8 of a fastening device c, so that the projections 10 can be formed upon the nut without causing them to project beyond the outer end surface of the nut, as shown in Figs. III and IV. I would remark also that of the eight grooves 6 formed in the square nut illustrated the two adjacent grooves of adjacent sides of the nut, which are arranged at opposite sides, respectively, of the corner formed between the said sides of the nut, are placed in open relation at their outer ends by another straight groove 12, which is formed in the outer end of the nut between the said corner and the bore of the nut and is adapted to be engaged by the central member 9 of a fastening device c, applied with its end members 8 and 8 in engagement with the grooves 6 and 6, connected by the said groove 12, as shown in solid lines, Figs. I, II, and III. Preferably each nut is provided with two nut-fastening devices c and c, arranged diametrically opposite each other, and obviously instead of applying the fastening devices adjacent to opposite corners of the nut, as shown in Figs. I, II, and III, the two fastening devices may be applied at opposite parallel sides of the nut, as shown in Fig. V.

I would have it understood that although I have shown an exceedingly desirable construction my invention is not limited to the exact details illustrated, but embraces, broadly, in combination with the screw-threaded bolt-shank or stud and a correspondingly-threaded nut engaging the threaded portion of the said shank or stud, a fastening device having end members engaging inwardly-converging grooves formed in an end of the nut with at least one of the said end members projecting into the bolt and with the fastening device between the said end members snugly engaging the bolt.

The construction illustrated and comprising eight equidistantly-spaced radial grooves 6 in the nut is obviously valuable, because in tightening the nut against an object into or through which the nut-engaging bolt or stud extends a comparatively small fraction of a complete rotation of the nut will bring two adjacent grooves 6 of the nut into registry with a pair of grooves 7 of the bolt or stud and accommodate the application of a fastening device c.

What I claim is—

1. The combination, with the screw-threaded portion of a bolt-shank or stud provided with a pair of grooves which extend longitudinally of the bolt or stud and are arranged a suitable distance apart circumferentially of the bolt or stud, and a nut engaging the said threaded portion of the bolt-shank or stud and provided, in one end thereof, with several radially-arranged grooves spaced equidistantly circumferentially of the nut and having such arrangement, relative to the grooves in the bolt-shank or stud, as to render any two adjacent grooves in the nut capable of registering with the different grooves, respectively, in the bolt or stud upon the proper circumferential adjustment of the nut, of a fastening device having two members engaging the different grooves, respectively, in the bolt or stud and engaging the grooves in the nut which register with the said grooves in the bolt or stud.

2. The combination, with the screw-threaded portion of a bolt-shank or stud provided with two pairs of grooves which extend longitudinally of the bolt or stud and are arranged a suitable distance apart circumferentially of the bolt or stud, with the grooves of each pair of grooves parallel, and the nut engaging the said threaded portion of the bolt-shank or stud and provided, in one end thereof, with as many radially-arranged grooves as there are grooves in the bolt-shank or stud, with the grooves of the nut having such arrangement relative to the grooves in the bolt-shank or stud as to render the grooves in the nut capable of registering with the grooves in the bolt or stud upon a proper circumferential adjustment of the nut, of a fastening device having members engaging the grooves of one of the pairs of grooves in the bolt or stud and engaging grooves in the nut, and another fastening device engaging the grooves of the other pair of grooves in the bolt and engaging grooves in the nut.

3. The combination of the screw-threaded portion of a bolt-shank or stud, and a square nut mounted upon the said screw-threaded portion of the bolt-shank or stud and provided in one end thereof with a series of eight radially-arranged grooves spaced equidistantly circumferentially of the bolt or stud and having such arrangement that each corner of the nut shall be between two adjacent grooves of the said series of grooves, of a fastening device extending between and engaging adjacent grooves in the nut and extending into the bolt or stud, and the two grooves adjacent to, but at opposite sides, respectively, of each corner of the nut being connected at their outer ends by another groove formed in the nut and arranged to be engaged by the central portion of the fastening device when the latter is placed in engagement with the said connected grooves.

Signed by me at Cleveland, Ohio, this 21st day of May, 1901.

HENRY HENTHORNE.

Witnesses:
C. H. DORER,
A. H. PARRATT.